(12) United States Patent
Lee

(10) Patent No.: US 9,784,395 B2
(45) Date of Patent: Oct. 10, 2017

(54) ASYMMETRIC LATCH RELEASE MECHANISM

(71) Applicant: Chloe Hyesung Lee, Anaheim Hills, CA (US)

(72) Inventor: Chloe Hyesung Lee, Anaheim Hills, CA (US)

(*) Notice: Subject to any disclaimer, the term of this patent is extended or adjusted under 35 U.S.C. 154(b) by 166 days.

(21) Appl. No.: 14/880,220

(22) Filed: Oct. 10, 2015

(65) Prior Publication Data

US 2017/0102104 A1    Apr. 13, 2017

(51) Int. Cl.
*F16L 37/12* (2006.01)

(52) U.S. Cl.
CPC .................. *F16L 37/1235* (2013.01)

(58) Field of Classification Search
CPC ..... F16L 37/12; F16L 37/1235; F16L 37/121; F16L 37/127; F16L 37/0842; F16L 37/0847; F16L 37/0848; F16L 37/096; Y10T 403/608; Y10T 403/7081
USPC .......................... 285/307, 311, 318, 314, 317
See application file for complete search history.

(56) References Cited

U.S. PATENT DOCUMENTS

| | | | | |
|---|---|---|---|---|
| 310,672 A * | 1/1885 | Hackley | ............... | F16L 27/0812 279/20 |
| 3,744,824 A * | 7/1973 | Roos | ................... | F16L 37/0842 285/317 |
| 4,220,360 A * | 9/1980 | Jacek | .................... | F16L 37/096 285/317 |
| 4,458,719 A * | 7/1984 | Strybel | ................. | F16L 37/127 137/614.03 |
| 4,577,837 A * | 3/1986 | Berg | ................. | A47G 27/0493 248/408 |
| 5,707,340 A * | 1/1998 | Hipp | ................... | A61B 1/00195 285/314 |
| 5,816,633 A * | 10/1998 | Odom | ...................... | A01B 1/00 172/375 |
| 6,089,335 A * | 7/2000 | Able | ....................... | E21B 25/02 175/234 |
| 7,431,346 B2 * | 10/2008 | Frost | ..................... | F16L 37/096 285/307 |
| 8,602,457 B2 * | 12/2013 | Boraas | .................. | F16L 37/096 285/314 |

* cited by examiner

*Primary Examiner* — Joshua Kennedy

(57) ABSTRACT

A latching or release mechanism in which the insertion force can be different from the removal force. Furthermore, the said latching or release mechanism will automatically release upon applied removal force. The latching or release mechanism additionally can be readily adapted for use as a fluid coupler or as a pass-through latch.

1 Claim, 9 Drawing Sheets

ASYMMETRIC LATCH RELEASE MECHANISM

DETAILED DESCRIPTION OF THE INVENTION

Figure 1:
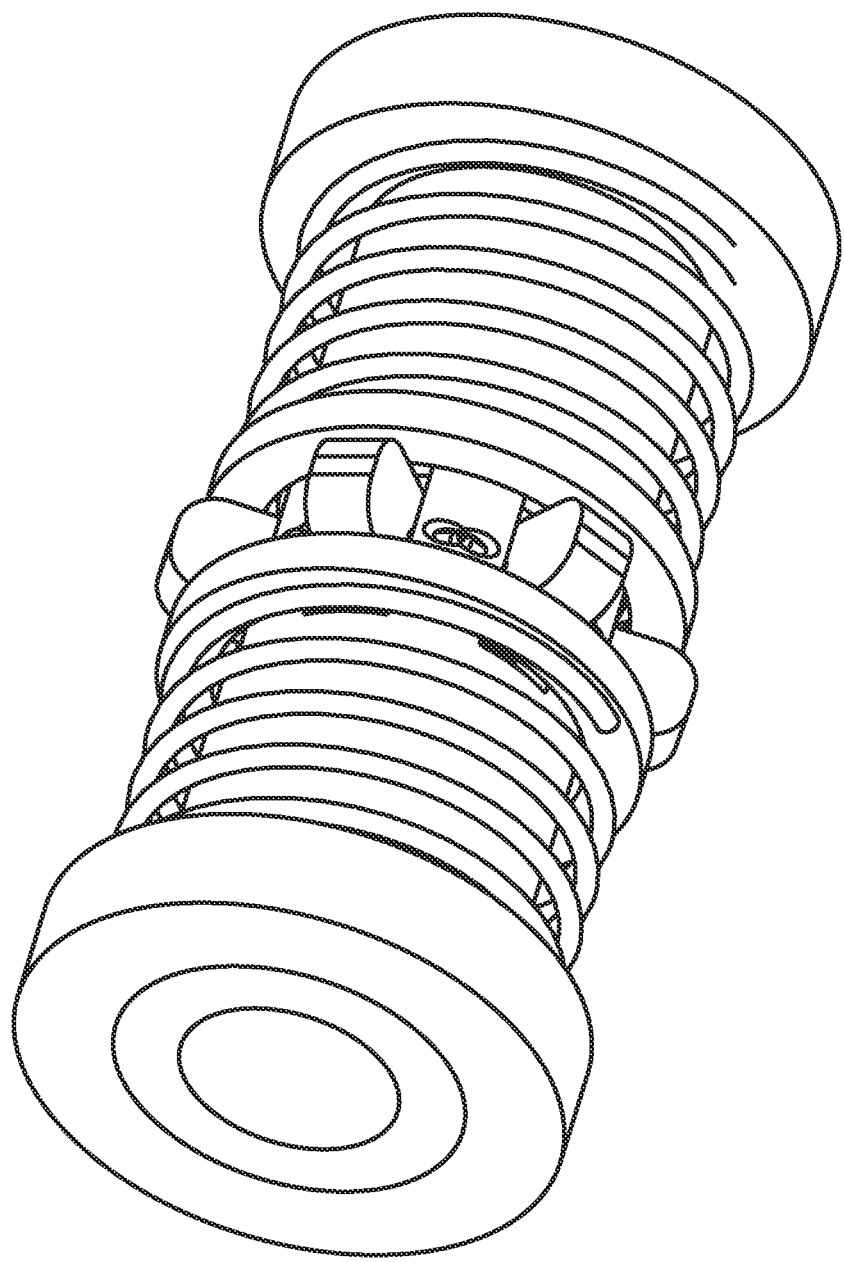
FIG. 1 shows an perspective view of the latching or release mechanism.
Figure 2:
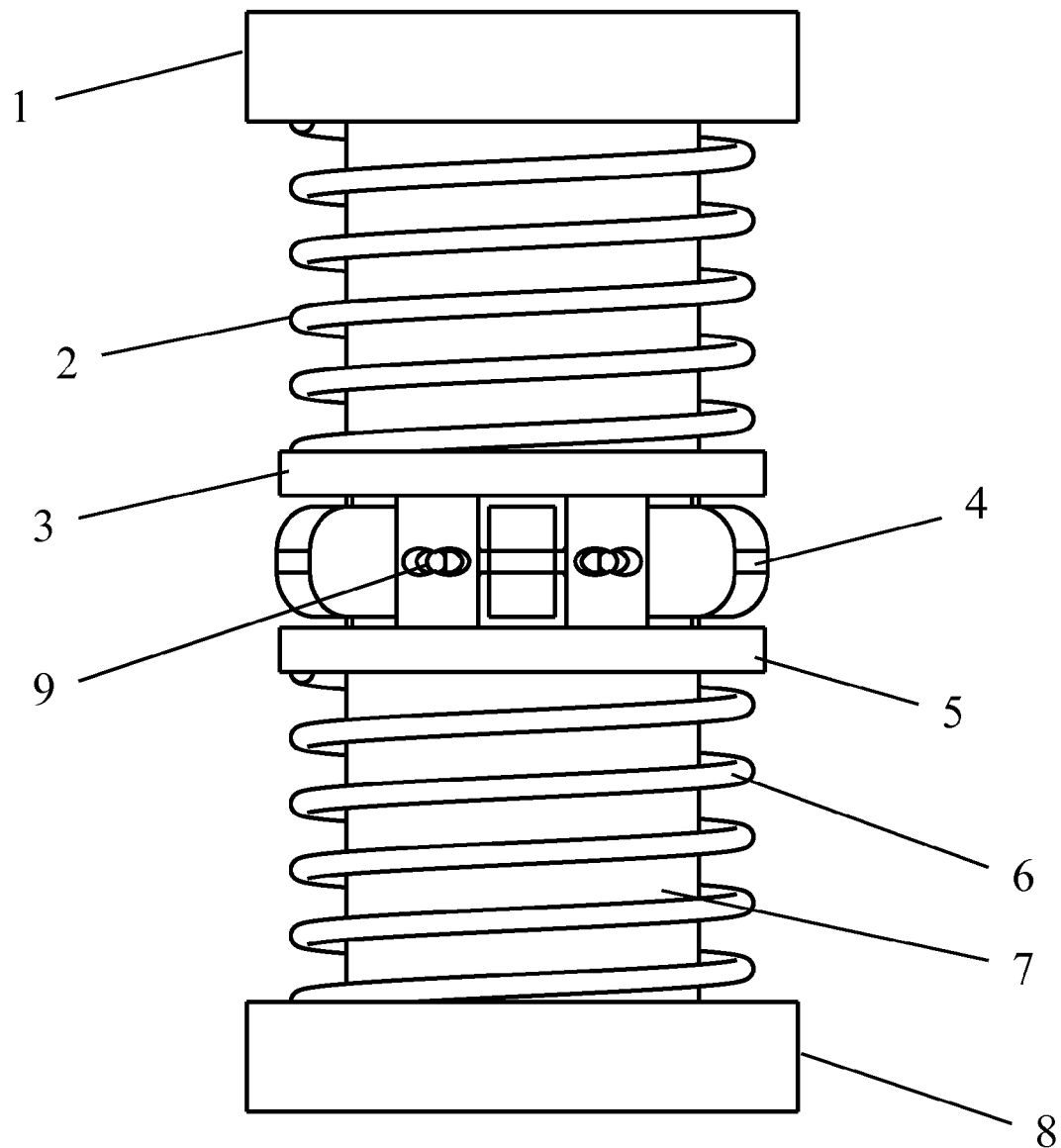
FIG. 2 shows a front view of the latching or release mechanism.
Figure 3:
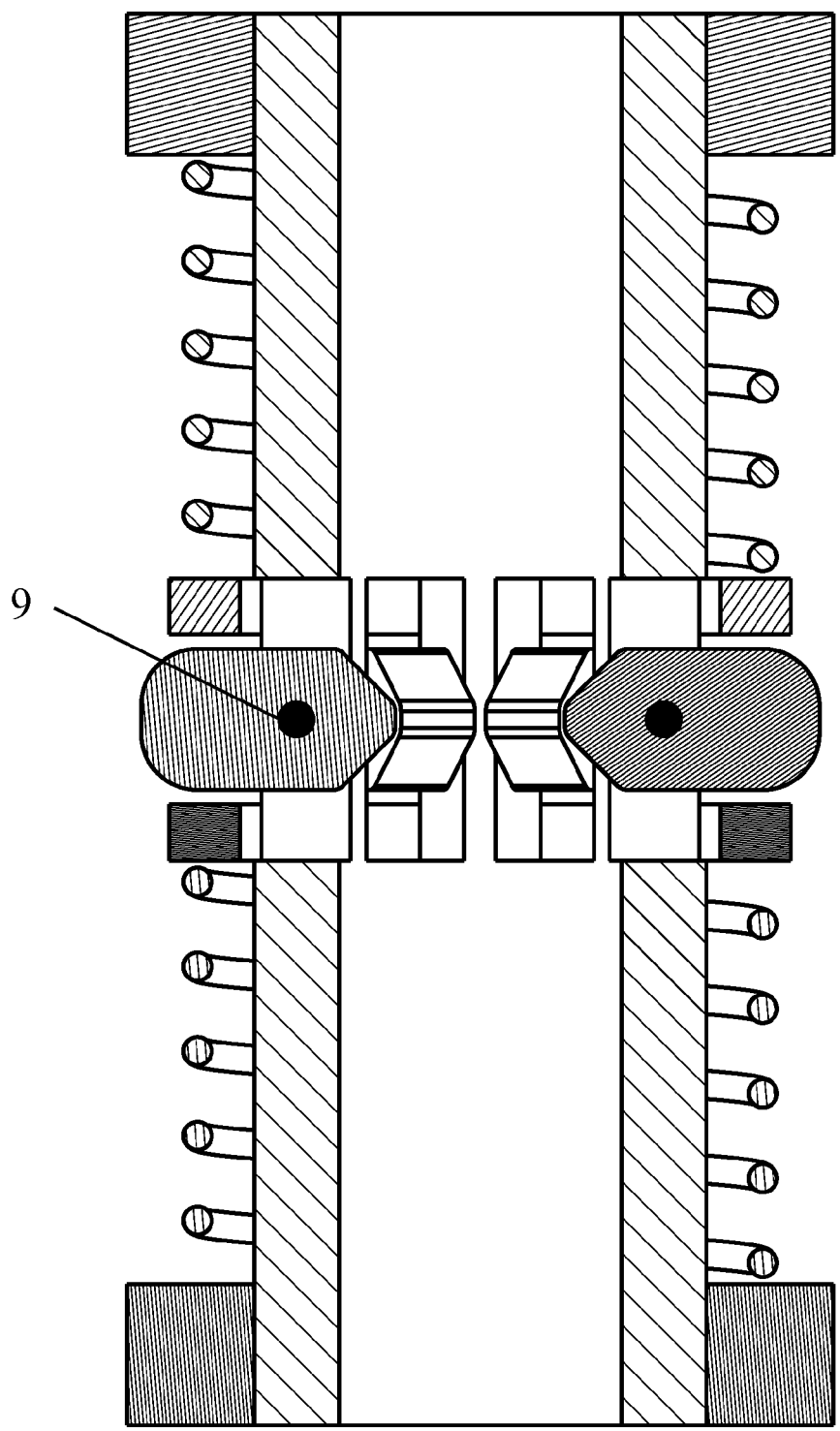
FIG. 3 shows a vertical cross section view of the latching or release mechanism.
Figure 4:
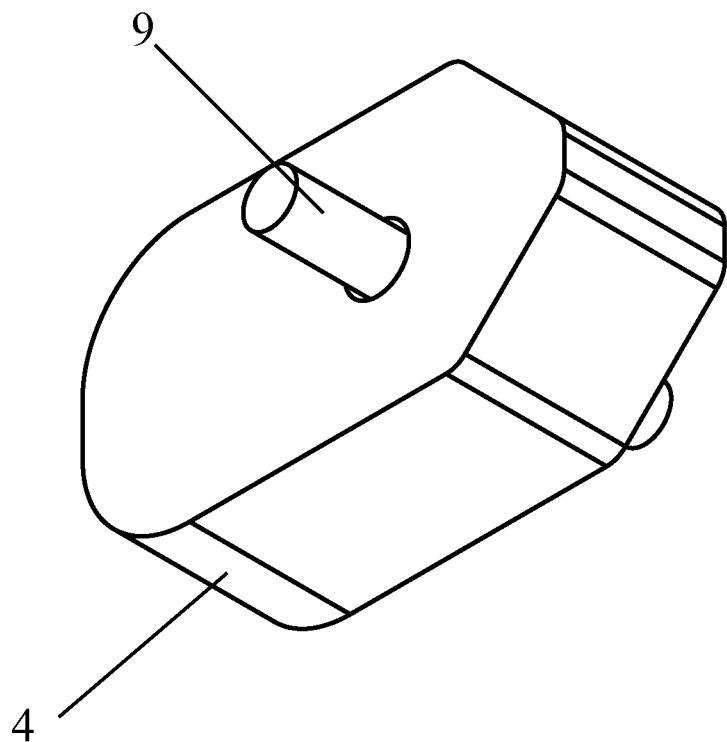
FIG. 4 shows an perspective view of the rotating gate.
Figure 5:
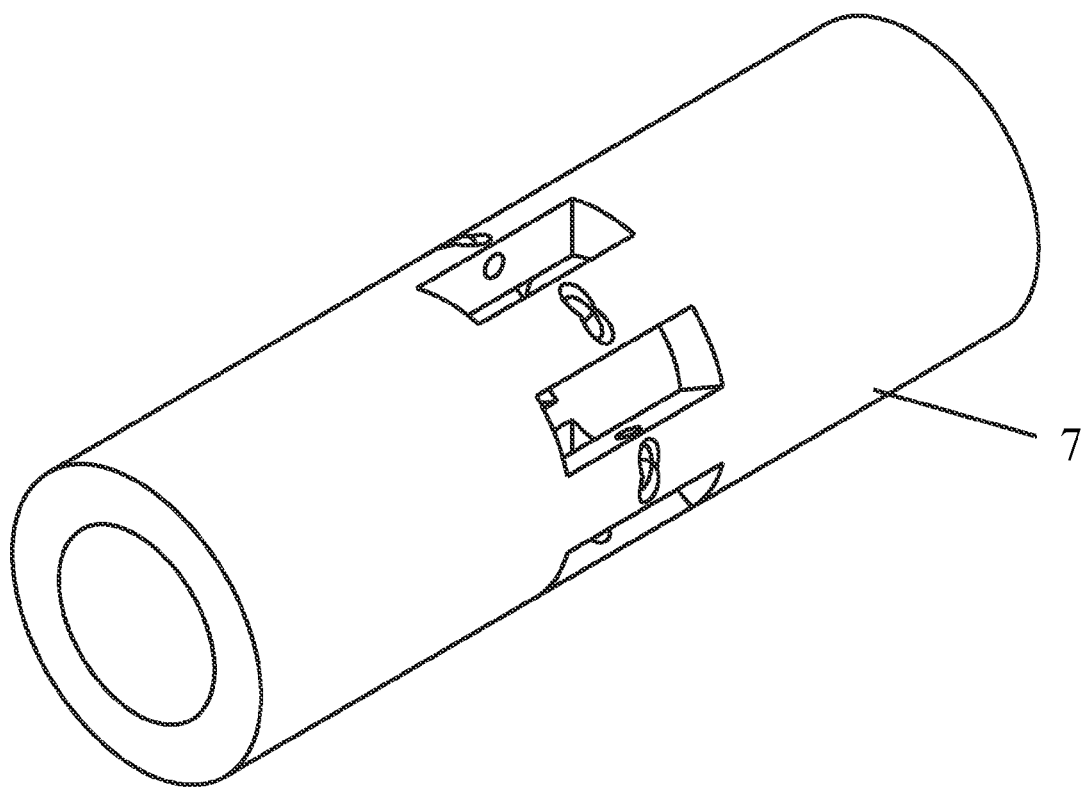
FIG. 5 shows an perspective view of the inner tube.

The latching or release mechanism consists of an inner tube 7, which, as shown in FIG. 5, has a plurality of openings spaced radially around the tube. The size of the openings are of such dimensions as to allow the rotating gate 4 to rotate freely around the axis rod 9. A plurality of rotating gates 4 are assembled to the openings in inner tube 7 using a plurality of axis rods 9. Entry washer 5 and exit washer 3 rests upon the assembled rotating gates 4. Note a raised feature at the top and bottom edge of the openings on the outer face of inner tube 7 prevents the washers 3 and 5 from moving pass the openings. An exit spring 2 is placed upon exit washer 3 and applies its spring force upon exit washer 3 in conjunction with exit spring stopper 1. Similarly, entry spring 6 is placed upon entry washer 5 and applies its spring force upon entry washer 5 in conjunction with entry spring stopper 8.

Figure 6:
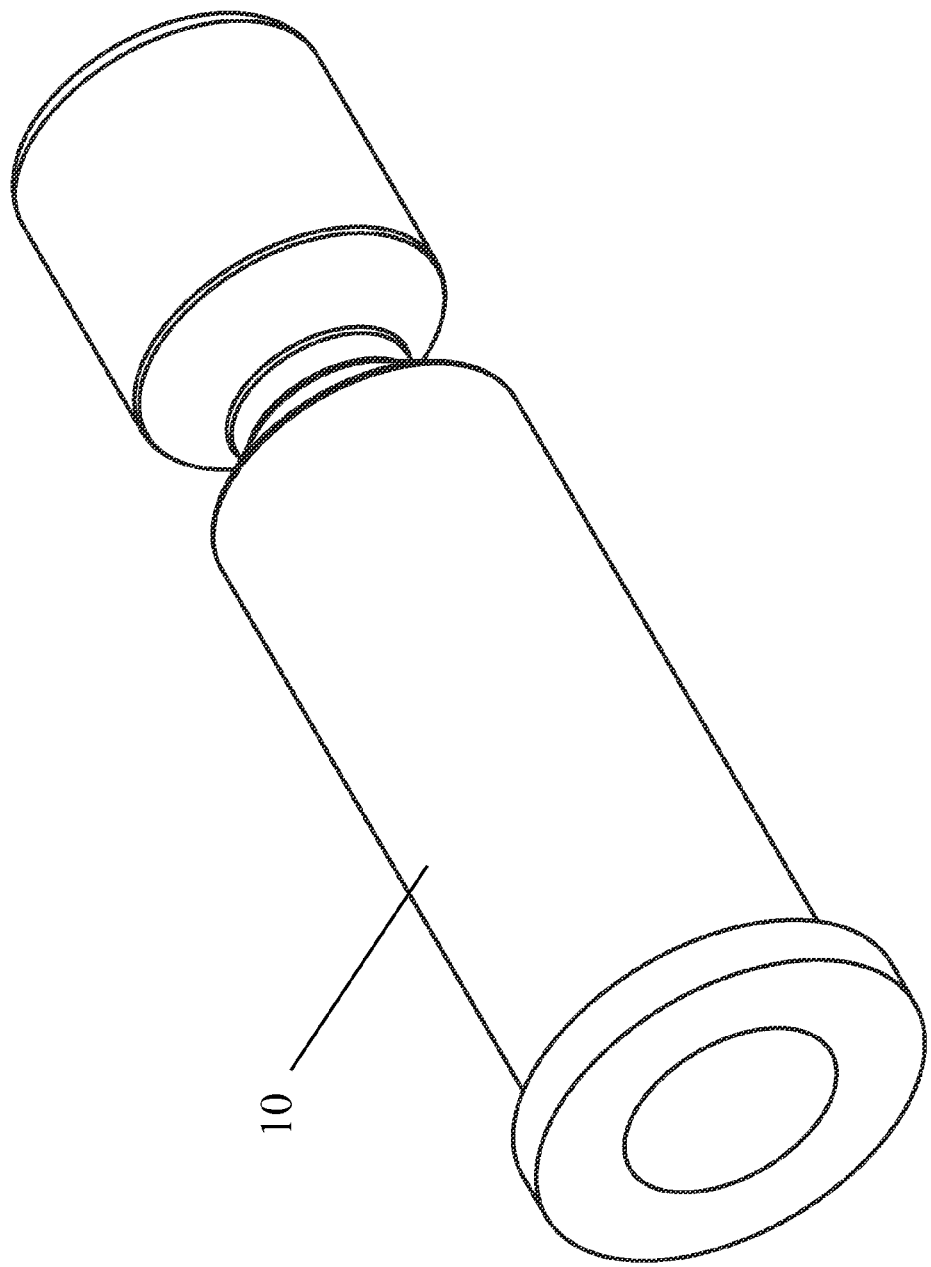
FIG. 6 shows an perspective view of the fluid coupler fitting.
Figure 7:
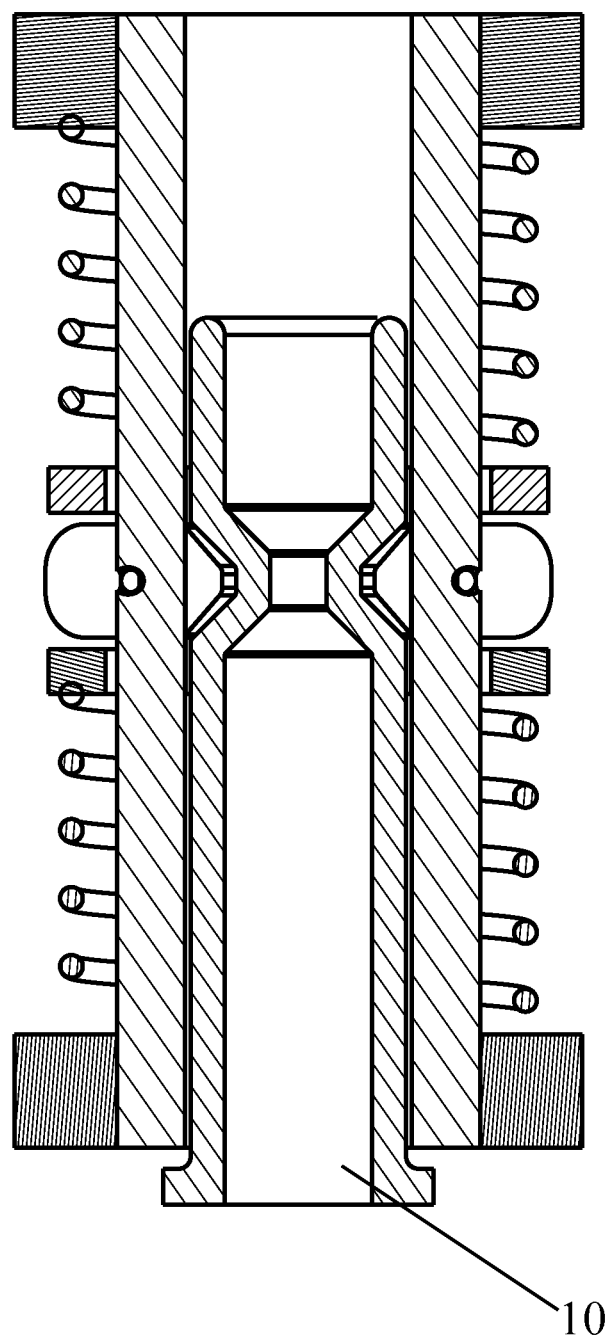
FIG. 7 shows a vertical cross section view of the latching or release mechanism with the fitting in its engaged state.

In an embodiment as a fluid coupler, fluid coupler fitting 10 is employed to receive fluid as shown in FIG. 6. The bottom end of the fluid coupler fitting 10 is threaded to accept the part of the line to be coupled. Similarly the exit opening of inner tube 7 is threaded to accept the part of the line to be coupled. The fluid coupler fitting 10 is a cylindrical tube of similar dimension as the inner dimension of the inner tube 7 to allow fluid coupler fitting 10 to pass without hindrance within inner tube 7. A shoulder feature below the top end of fluid coupler fitting 10 is formed. This shoulder feature is dimensioned to fit the projecting part of the rotating gates 4 within inner tube 7 (see FIG. 7). In operation the entry spring 6 and exit spring 2 exert force to maintain rotating gates 4 in a horizontal orientation which restrict objects from passing through inner tube 7. Fluid coupler fitting 10 is inserted into the bottom of the mechanism and into inner tube 7. As fluid coupler fitting 10 passes up inner tube 7 the top end of fluid coupler fitting 10 contacts rotating gates 4. This causes rotating gates 4 to rotate. The rotation causes rotating gates 4 to exert pressure on entry washer 5 which starts to compress entry spring 6. Further upwards pressure on fluid coupler fitting 10, pressure sufficient to overcome the spring force of entry spring 6 allows the rotating gates 4 to rotate such that the protruding part of the rotating gates 4 retracts into the openings of inner tube 7, allowing the top end of the fluid coupler fitting 10 to pass. Fluid coupler fitting 10 continues up inner tube 7 until the bottom shoulder of the fluid coupler fitting 10 contacts the base of the entry spring stopper 8. In this position, the shoulder feature of the fluid coupler fitting 10 is aligned with the axis of rotation of the rotating gates 4. The spring force of entry spring 6 causes the rotating gates 4 to return to the horizontal position latching the fluid coupler fitting 10 in place. Similarly, in removal, a downward force sufficient to overcome the spring force of exit spring 2 will cause rotating gates 4 to rotate and releases the fluid coupler fitting 10.

The insertion and removal force is determined by the corresponding entry or exit spring. By using different springs of differing spring force, the insertion and removal force can be made dissimilar. For example, the entry spring could be selected to have a low spring force and the exit spring to have a high spring force. Here it would be easy to make the connection but harder to disconnect.

Figure 8:
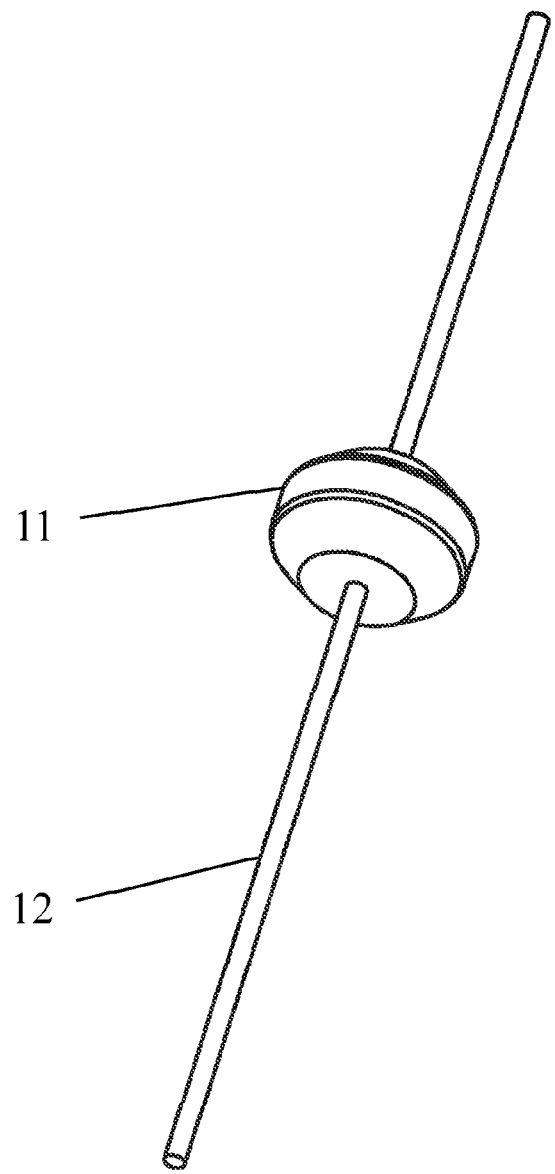
FIG. 8 shows an perspective view of pass-through latch fitting.
Figure 9:
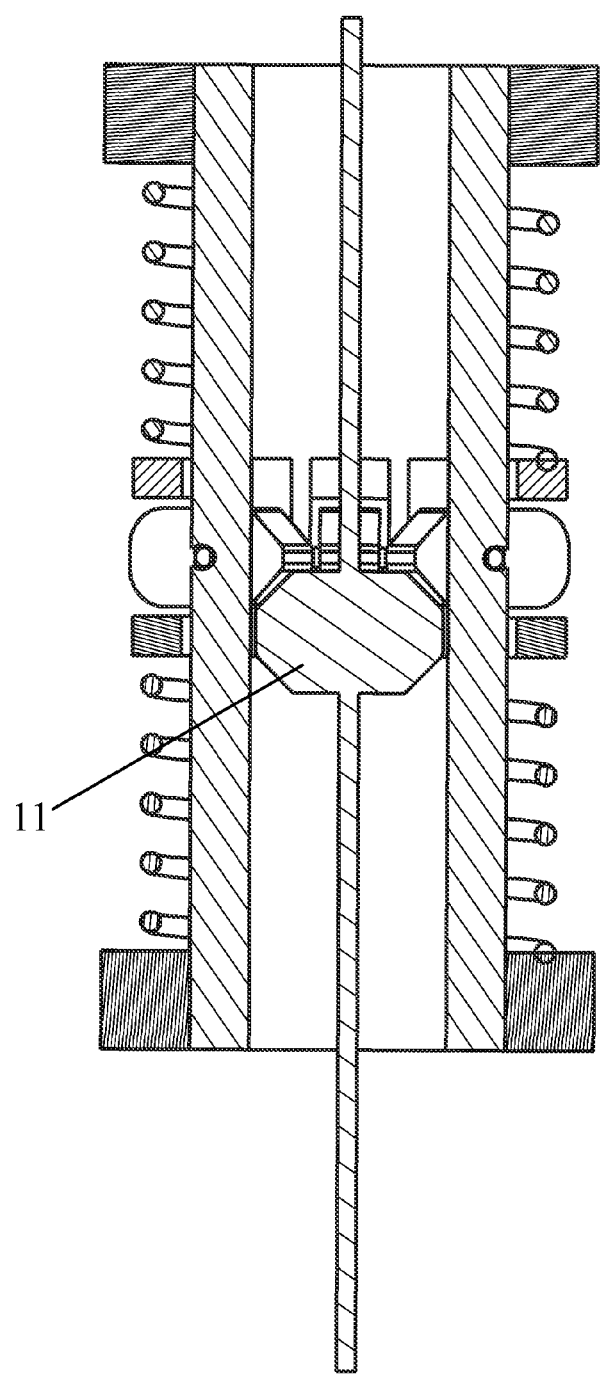
FIG. 9 shows a vertical cross section view of the latching or release mechanism with the pass-through latch fitting restricted by the rotating gates.

In another embodiment, the mechanism is configured as a pass-through latch. FIG. 8 shows the fitting for the pass-through latch. The pass-through latch fitting consists of a thick disc shaped stopper 11 affixed to a flexible cord 12. The radial dimension of stopper 11 is similar to the inner dimension of inner tube 7 to allow stopper 11 to pass without hindrance within inner tube 7. The stopper 11 is of sufficient thickness to allow stopper 11 to form a short cylinder. This feature prevents stopper 11 from twisting off-axis as it passes along inner tube 7. FIG. 9 shows a vertical cross sectional view of the mechanism configured as a pass-through latch. In operation, cord 12 is passed through and out the top end of inner tube 7. The stopper 11 moves up with cord 12 and is restricted by the rotating gates (see FIG. 9). Further upward pressure on cord 12 causes stopper 11 to contact rotating gates 4. This causes rotating gates 4 to rotate. The rotation causes rotating gates 4 to exert pressure on the entry washer 5, which starts to compress entry spring 6. Upon further upward pressure on cord 12, pressure sufficient to overcome the spring force of entry, spring 6 allows rotating gates 4 to rotate so that the protruding part of rotating gates 4 retracts into the openings of inner tube 7 allowing stopper 11 to pass. Similarly, in removal a downward force sufficient to overcome the spring force of exit spring 2 will cause rotating gates 4 to rotate and release stopper 11.

In can be seen by those verse in the arts that the present embodiment can easily be modified to act as a pin-type latch mechanism.

The invention claimed is:
1. A latching or release mechanism comprising:
   a. a length of tube having a plurality of openings spaced radially around the tube,
   b. a plurality of rotating gate members having dimensions similar to said openings,
   c. each of said rotating gate members being pivotally mounted within a corresponding opening of said plurality of openings of said tube,
   d. a first and second washer mounted about said tube, said first washer in contact with a first side of each of said plurality of rotating gate members, and said second washer in contact with an opposing side of each of said plurality of rotating gate members,
   e. a first spring in contact with said first washer to apply pressure to said rotating gate members in one direction and a second spring in contact with said second washer to apply pressure to said rotating gate members in an opposing direction to maintain said rotating gate mem- bers in an orientation transverse to said length of tube so that a diametric restriction is formed within said tube.

* * * * *